US010650432B1

(12) United States Patent
Joseph et al.

(10) Patent No.: US 10,650,432 B1
(45) Date of Patent: May 12, 2020

(54) RECOMMENDATION SYSTEM USING IMPROVED NEURAL NETWORK

(71) Applicant: Amazon Technologies, Inc., Seattle, WA (US)

(72) Inventors: Rejith George Joseph, Seattle, WA (US); Oleg Rybakov, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 597 days.

(21) Appl. No.: 15/362,585

(22) Filed: Nov. 28, 2016

(51) Int. Cl.
*G06Q 30/00* (2012.01)
*G06Q 30/06* (2012.01)
*G06N 3/08* (2006.01)

(52) U.S. Cl.
CPC .......... *G06Q 30/0631* (2013.01); *G06N 3/08* (2013.01)

(58) Field of Classification Search
CPC .......... G06Q 30/0631; G06Q 30/0255; G06Q 10/0838; G06Q 10/0639; G06Q 30/0601
USPC .............................................. 705/26.1, 27.1
See application file for complete search history.

(56) References Cited

U.S. PATENT DOCUMENTS

| 7,685,074 | B2 | 3/2010 | Linden |
| 8,032,425 | B2 | 11/2011 | Yi |
| 8,117,085 | B1 | 2/2012 | Smith |
| 8,145,512 | B1 | 3/2012 | Henne |
| 10,223,742 | B2* | 3/2019 | Arora ................ G06F 16/24578 |
| 2014/0172652 | A1* | 6/2014 | Pobbathi ............. G06Q 10/087 705/28 |
| 2017/0293695 | A1* | 10/2017 | Brovman ........... G06Q 30/0631 |
| 2018/0143986 | A1* | 5/2018 | Sinha ................ G06Q 30/0242 |

OTHER PUBLICATIONS

Patents; researchers submit patent application, "selective reminders to complete interrupted tasks," (2016) Computer Weekly News.*

* cited by examiner

*Primary Examiner* — Brandy A Zukanovich (74) *Attorney, Agent, or Firm* — Knobbe Martens Olson & Bear LLP (57) ABSTRACT

Some aspects of the present disclosure relate to generating and training a neural network by separating historical item interaction data into both inputs and outputs. This may be done, for example, based on date. For example, a neural network machine learning technique may be used to generate a prediction model using a set of inputs that includes both a number of items purchased by a number of users before a certain date as well as some or all attributes of those items, and a set of outputs that includes the items purchased after that date. The items purchased before that date and the associated attributes can be subjected to a time-decay function.

10 Claims, 5 Drawing Sheets

RECOMMENDATION SYSTEM USING IMPROVED NEURAL NETWORK

BACKGROUND

Computer learning models can process large volumes of user and item interaction data (such as data reflective of user interactions with an electronic catalog of items) to provide relevant recommendations for users. For example, a model may be implemented as an artificial neural network. Artificial neural networks are artificial in the sense that they are computational entities, analogous to biological neural networks in animals, but implemented by computing devices. A neural network typically comprises an input layer, one or more hidden layers and an output layer. The nodes in each layer connect to nodes in the subsequent layer and the strengths of these interconnections are typically learnt from data during the training process. In recommendation systems, such as systems designed to recommend items (e.g., goods and/or services) to users based on the purchase or acquisition histories of the users, neural network models may generate probability scores indicating the probabilities of a user purchasing or otherwise acquiring items during a time period.

The parameters of a neural network can be set in a process referred to as training. For example, a neural network can be trained using training data that includes input data and the correct or preferred output of the model for the corresponding input data. Sets of individual input vectors ("mini-batches") may be processed at the same time by using an input matrix instead of a single input vector, which may speed up training. The neural network can repeatedly process the input data, and the parameters (e.g., the weight matrices) of the neural network can be modified in what amounts to a trial-and-error process until the model produces (or "converges" on) the correct or preferred output. The modification of weight values may be performed through a process referred to as "back propagation." Back propagation includes determining the difference between the expected model output and the obtained model output, and then determining how to modify the values of some or all parameters of the model to reduce the difference between the expected model output and the obtained model output.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

The present disclosure is directed to generating and using machine learning models, and specifically to a recommendation system that uses an improved neural network to predict a relatively larger number of item interaction events based on a relatively smaller number of past item interaction data. (In the context of an electronic catalog of items, the interaction events may, for example, be item purchase events, item viewing events, item downloads, shopping cart add events, item rating events, and/or other types of events that reflect user affinities for particular catalog items.) Typical similarity-based recommendation engines, which can identify similar products based on purchase histories of users, rely on a co-occurrence matrix representing probabilities of co-purchasing items. Such matrices can be generated based on identified correlations between purchases of the items in existing customer purchase histories, for example of a number of users of an electronic marketplace. However, these existing similarity-based recommendation engines face limitations regarding predicting items that may be purchased together (for example, in the same transaction, or by the same user within a timeframe of a day, week, month, or season) with new or existing items that have limited or no associated purchase history. This problem is sometimes referred to as a "cold start problem." Existing solutions for solving the cold start problem require training the similarity-based recommendation engine and separately training a vector distance recommendation engine that uses purchase histories of users to generate a vector representation and compute the distance between vector descriptions of items purchased together. Input data thus must pass through two different recommendations pipelines to generate a recommendation, increasing computing time, and each recommendations engine requires separate and significant computing resources for periodic retraining.

In the disclosed system, a neural network can be trained using actual purchases of users made in an earlier time period to train the neural network to predict the items (or attributes of the items) actually purchased by such users during a later time period. For example, the neural network can be trained to predict a window of recent purchases using input data of a window of less recent purchases, where the input data includes both identifiers of the items in the less recent window as well as attributes of these items. Attributes can include category, brand, price, keywords, user ratings, delivery timeframe, product origin, and the like. These attributes can include all known attributes of the items or a strategically selected subset of the attributes selected based on, for example, an analysis of which attributes most heavily influence customer purchases. Such analyses can be conducted, for example, through surveys, statistical analyses, or machine learning. The output data can include the items in the recent window. By incorporating both item identifiers and item attributes in the input data, the neural network can be trained to correlate both previously purchased items and the attributes of those items with recently purchased items. In the present example of neural networks trained based solely on purchase histories (and associated attributes), the output scores of the neural network represent likelihood of future purchases. Such a neural network solves the cold start problem without requiring the additional computing resources—processing time and hardware to accommodate training—of the two-pipeline approach of existing recommendations systems. Another benefit of the disclosed neural network is that it does not require two separate pipelines to generate recommendations for established items and cold start items.

In some examples training data can include item interaction data split into a more recent group and a less recent group. Item interaction data can include purchase histories (as in the example above), browsing histories, item selection histories, and other user-item interaction events. In such examples the input group can include both the items and associated attributes of the less recent group (and optionally of the users who interacted with these items) while the output group can include the items of the more recent group. For example, item interaction data can be separated into input events occurring within the first day, few days, or week, and input events occurring within the last six months, year, years, all event history, or other predetermined timeframe and an output group including the remainder of the timeframe. The timeframe of the training data and the data split date dividing input data from output data can be fixed, predetermined windows of time based on the end date of the training data in some embodiments. In other embodiments the timeframe of the training data and the data split date can be dynamically determined, for example to obtain a desired amount of input data and a desired amount of output data. In one embodiment of the disclosed training techniques, the timeframe of the training data can include six months of item interaction events, and the date split can be located a week after to the beginning of the timeframe. Thus, the output data can include items and associated attributes of interaction events occurring between six months and a week after to the beginning date of the training data, and the input data can include items of interaction events within the first week of the training data. The size of the timeframe of the training data can be kept relatively small, for example within a month in some embodiments, to preserve sensitivity of the prediction model to seasonality and to reduce the influence of past events that may no longer be relevant. In some embodiments the window size can be unlimited but a time-decay function can reduce the influence of such past events.

To illustrate, consider the following example. A purchase history of customer C1 and C2 at purchase times T1-T5 can include items A1-A7, as shown in Table 1 below.

|  | T1 | T2 | T3 | T4 | T5 |
|---|---|---|---|---|---|
| C1 | A1 | A2 | A3 | A4 | A5 |
| C2 | A3 | A4 | A6 | A7 | |

A first training sample can include input data of the items (and any attributes of the items and optionally customers) bought at T1, and can include output data of items bought at T2-T5. A second training sample can include input data of the items (and any attributes of the items and optionally customers) bought at T2, and can include output data of items bought at T3-T5. As such, the window of the input data used for training is smaller than the window of the output data and slides forward from past towards the present during subsequent trainings. By using training techniques similar to this example, the neural network can learn what is the probability of a number of different future purchases given that customer purchased a small subset of products in the past (as in above example, the input data includes only one item per customer). As such, the neural network can be capable of generating a wide range of predictions given a small second input data set.

The neural network can be trained at predetermined intervals using updated item interaction data. For example, the neural network can be trained once per day using purchase histories of users of an electronic commerce system. Other examples can implement different training intervals and use different user-item interaction events for training, for example item interaction events such as item page views, web page browsing, digital advertisement selections, and the like. An item interaction event or user-item interaction event may be any logged user behavior or event in which an item is consumed (for example, purchased, viewed, used, clicked on, interacted with, etc.). As used herein, a purchase refers to exchange of money, gift card funds, or credits for the permanent purchase or temporary rental of any physical or digital item. Item interaction data can repository 105, for example in the ecommerce context, item purchase histories, item viewing histories, item add histories (for example adding an item to a cart without subsequently purchasing the item or adding the item to a wish list), item sharing, item ratings, and the like. Item interaction data can repository 105 additionally or alternatively include item viewing events and user browsing histories. The periodic retraining of the neural network, using updated data and the sliding windows created by the date split, allows the model to adapt to seasonal trends when predicting item interaction events.

A recommendations system according to the present disclosure can use a neural network trained as described above to build an item to item mapping across a list of available items, for example items for sale in an electronic catalog. The mapping can be stored for later access in generating a prediction or recommendation for any item in the list, whether or not there is any user-item interaction history associated with that item. As such, a neural network as described herein requires fewer processors or other processing resources for training than conventional dual-pipeline recommendations systems due to training a single neural network to provide recommendations for both established items and cold start items. In addition, the disclosed neural network can produce a recommendation with an accuracy comparable to, or even better than, the accuracy of a dual-pipeline recommendation system while requiring significantly less computing hardware. Such neural networks may be used in a variety of machine learning applications and other systems, including but not limited to: item recommendation generation, automatic speech recognition, facial recognition, handwriting recognition, and image recognition. For example, the neural network may be used for generating recommendations of items that a user may wish to view, obtain, access, etc. based on the user's prior actions regarding other items.

According to some aspects, a neural network of a particular topology can be trained intermittently and/or periodically based on updated historical item interaction data. Each time the neural network is re-trained, a sliding window of a less recent group of item interaction events can be used as the input and a sliding window of a more recent group of item interaction events can be used as the expected output. Thus, in addition to using a single recommendations pipeline to solve the cold start problem, the disclosed neural network can accommodate changes in purchase behavior or other item interaction behavior due, for example, to seasonal trends.

Further aspects of the present disclosure relate to methods of using a neural network to generate output. For example, the training data used to train the neural network may be collected from a large number of users, but to generate a prediction, the item interaction event history of a single user can be run through the neural network to get personalized item event predictions. In some embodiments, elements of the input vector of a user can correspond to items with 1 representing that the user has purchased an item during a time period, and 0 representing that the user has not purchased the item during the time period, and to attributes with 1 representing that an item purchased during the time period has the attribute, and 0 representing that no item purchased during the time period has the attribute. An element of the output vector can be a predicted probability of the user purchasing the item during a subsequent time period. For example, if the probability has a value greater than 0.5, then the user has a high probability of purchasing the item in the subsequent time period. Such an item can be recommended to the user.

Neural networks, including but not limited to deep neural networks ("DNNs"), typically have multiple layers of nodes. Illustratively, a neural network may include an input layer, and output layer, and any number of intermediate, internal, or "hidden" layers between the input and output layers. The first layer (referred to as the "input layer" herein) has input nodes which send data via synapses to the second layer of nodes, and then via more synapses to the third layer of output nodes. Some systems can have more layers of nodes, some having increased layers of input nodes and output nodes. Each hidden layer can transform the input data and output the transformed data for use by a subsequent layer. Activation functions and patterns in hidden layers can be considered as an encoding of how the network is programmed to identify significant features of the inputs. The individual layers may include any number of separate nodes. Each node can be considered as a computer-implemented simulation of a biological neuron and represents a connection between the output of one node to the input of another. Each node can be connected with many others by synapses, and links can be enforcing or inhibitory in their effect on the activation state of connected nodes. Each individual node may have a summation function which combines the values of all its inputs together, a threshold function, and/or limiting function on each connection and on the node itself such that it must surpass it before it can propagate to other neurons. Synapses may store parameters called weights that can manipulate the data in the calculations. Nodes of adjacent layers may be logically connected to each other, and each logical connection between the various nodes of adjacent layers may be associated with a respective weight. Conceptually, a node may be thought of as a computational unit that computes an output value as a function of a plurality of different input values. Nodes may be considered to be "connected" when the input values to the function associated with a current node include the output of functions associated with nodes in a previous layer, multiplied by weights associated with the individual "connections" between the current node and the nodes in the previous layer. A node may be thought of as a computational unit that computes an output value as a function of a plurality of different input values. Nodes may be considered to be "connected" when the input values to the function associated with a current node include the output of functions associated with nodes in a previous layer, multiplied by weights associated with the individual "connections" between the current node and the nodes in the previous layer.

When a neural network is used to process input data in the form of a matrix of input vectors (e.g., a batch of training data input vectors), the neural network may perform a "forward pass" to generate a matrix of output vectors. The input vectors may each include n separate data elements or "dimensions," corresponding to the n nodes of the neural network input layer (where n is some positive integer). Each data element may be a value, such as a floating point number or integer. The forward pass includes multiplying the matrix of input vectors by a matrix representing the weights associated with connections between the nodes of the input layer and nodes of the next layer, and applying an activation function to the results. The process is then repeated for each subsequent neural network layer.

Some neural networks have thousands of nodes, and millions of weights for connections between the nodes of all of the adjacent layers. Such neural networks may consume a large amount of space when stored, a large amount of bandwidth when transmitted, a large amount of memory when trained, and a large amount of processing resources when used due to the large number of calculations to be performed. In some cases, a neural network may be so large that it does not fit on a single processor (e.g., it may require more memory than is available to a single processor). For example, if the input layer and the output layer have more than 2,000,000 nodes and each of two internal layers has 1,024 nodes, then the neural network may not fit into a processor with 12 gigabytes ("GB") of memory. The neural network would then typically be split up and distributed among multiple processors. Generating a dual-pipeline recommendations system including two such neural networks, for example by training two neural networks in parallel using purchase histories and vector distance analyses as described above, introduces additional complexities in terms of the hardware and software required to train and use the neural networks. Such complexities are reduced, at least in part, by the single-pipeline neural networks described herein.

Although discussed within the context of neural networks, it will be appreciated that the training concepts described herein could be applied to other classifications including decision trees, semi-supervised expectation maximization functions, and other suitable machine learning models.

Various aspects of the disclosure will now be described with regard to certain examples and embodiments, which are intended to illustrate but not limit the disclosure. Although the examples and embodiments described herein will focus, for the purpose of illustration, specific calculations and algorithms, one of skill in the art will appreciate the examples are illustrative only, and are not intended to be limiting.

Example Recommendations System

Figure 1:
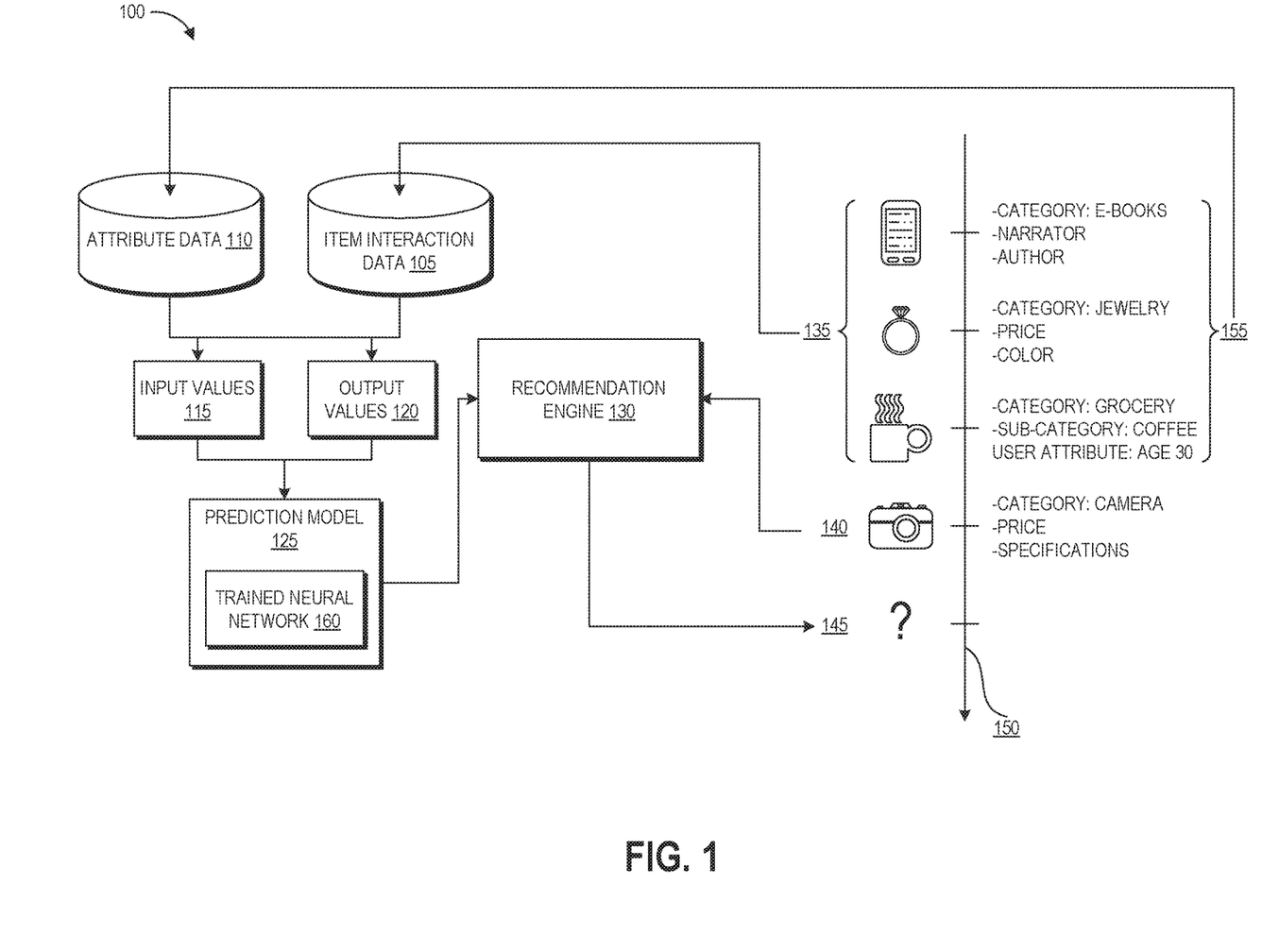
FIG. 1 depicts an illustrative example of data flow within a recommendation system that may be implemented in accordance with at least some embodiments.

FIG. 1 depicts an illustrative example of data flow within a recommendation system that may be implemented in accordance with at least some embodiments. In FIG. 1, a recommendation system 100 may include computer executable instructions that that implement one or more machine learning techniques to create a prediction model 125 that may be used to predict item interaction events based on item interaction data repository 105 and attribute data repository 110. As illustrated, prediction model 125 can include a trained neural network 160. Other embodiments can implement the other types of machine learning functions described herein.

Item interaction data repository 105 can include logged user behaviors with respect to items within a network environment. As used herein, an item can be a physical or digital product or service in an electronic marketplace ecommerce system. Outside of the ecommerce context an item can be a network page or web site visited by a user, a digital advertisement selected by a user, or other types of interactive digital content. An item interaction event may be any logged user behavior or event in which an item is consumed (for example, purchased, viewed, used, clicked on, interacted with, etc.). As used herein, a purchase refers to exchange of money, gift card funds, or credits for the permanent purchase or temporary rental of any physical or digital item. Item interaction data can repository 105, for example in the ecommerce context, item purchase histories, item viewing histories, item add histories (for example adding an item to a cart without subsequently purchasing the item or adding the item to a wish list), item sharing, item ratings, and the like. Item interaction data can repository 105 additionally or alternatively include item viewing events and user browsing histories. In some embodiments, an item interaction event may include an identifier for the item (for example, an item number, stock keeping unit (SKU), etc.), a date of the interaction event, an indication of the type of interaction, or any other suitable information.

Attribute data repository 110 can include item attributes representing characteristics of the items in the item interaction data repository 105, for example category, brand, price, keywords, user ratings, delivery timeframe, product origin, and the like. Attribute data repository 110 can additionally include, in some embodiments, user attributes representing characteristics of the users interacting with the items. For example, user attributes can include geographic location, age, gender, personas (for example, where multiple family members share an account), and other information known about a particular user. In such embodiments, the output of the hidden layer of a neural network can represent an embedding of user preferences.

The recommendation system 100 may receive an indication of user-specific item interaction events 135 (e.g., item interaction events that are each associated with a single user) and attributes 155 associated with the items in the events 135. Each of the user-specific item interaction events 135 may be stored in, and maintained by, the item interaction data repository 105 with respect to a timeline 150. For example, each item interaction event in item interaction data repository 105 may be associated with a timestamp or other suitable date/time indicator. The item interaction data repository 105 can include item interaction events associated with a number of users (for example, a consumer base for an electronic retailer). The attributes 155 may be stored in, and maintained by, the attribute data repository 110 with respect to the events in the interaction data repository 105 and/or the timeline 150.

The item interaction data repository 105 and attribute data repository 110 can be split into input values 115 and output values 120 for training a prediction model. The split can be a temporal split having two temporally non-overlapping ranges or "windows" by assigning a more recent subset of the item interaction data repository 105 to the output values 120 and a less recent subset of the item interaction data repository 105 to the input values 115. Attributes in the attribute data repository 110 that are associated with the less recent subset of item interaction data repository 105 can also be included in the input values. For example, data can be split so that the input values include item interaction events (and associated attributes) within a week or two weeks within the last two years, and the output values can include the item interaction events within the remainder of the last two years. Other data splits can include one year/one month, all history/one week, or other temporal splits based on the desired results. Due to this temporal data split, the prediction model 125 can generate a larger number of output scores using just a single or small group of second inputs.

In some embodiments, the item interaction data repository 105 and attribute data repository 110 can include events from a number of different users. In some implementations, the training data selected for the input values 115 and output values 120 may be limited to data from specific users. For example, training data can be limited to users who have user-item interaction events within at least the more recent window of events, and preferably have user-item interaction events within both the less recent and more recent windows.

A prediction model 125 can be generated from the input values 115 and output values 120. In one example, an artificial neural network machine learning technique may be used to generate the prediction model 125 by training a neural network with the input values 115 provided to an input layer and providing output values 120 to an output layer. The generated prediction model 125 may include a number of connections between the hidden layers and the input layer and/or output layer, each of which may be assigned a numeric weight generated based on a pattern identified between the set of input values 115 and the set of output values 120. In other examples, prediction model 125 may use any suitable system capable of receiving input, identifying patterns within the input data, and providing a prediction based on the identified patterns. For example, a prediction model may include a decision tree, a semi-supervised expectation maximization function, or another type of suitable machine learning function or algorithm.

Once a prediction model 125 has been generated, it may be used to predict one or more future item interaction events. For example, information about a seed item 140 can be provided to the recommendation engine 130 and input into the prediction model 125 to generate a prediction 145. The information can include an identifier of the seed item 140 and/or some or all of its attributers. The prediction 145 can be used as a basis for identifying a recommended item that generally users can be expected to interact with based on also interacting with the seed item 140. In some implementations, a list of a number of available items can be run through the prediction model 125 to generate a number of seed-recommended item pairings. These pairings can be stored for presenting recommendations to users who interact with identified seed items. Associations are created in computer storage between particular seed items and one or more recommended items. In some implementations, item interaction events associated with a particular user can be retrieved from the item interaction data repository 105 and input into the prediction model 125 together with a seed item 140 to generate a user-specific prediction 145. Such prediction can include one or more item interaction events that the user is predicted to initiate based on the user-specific data and the interaction with the seed item 140. The prediction 145 can be presented to the user in some embodiments. In some embodiments, predictions may be limited to items that have already been consumed at least one time within the determined more recent window of the training data timeframe.

Example Artificial Neural Networks

Figure 2:
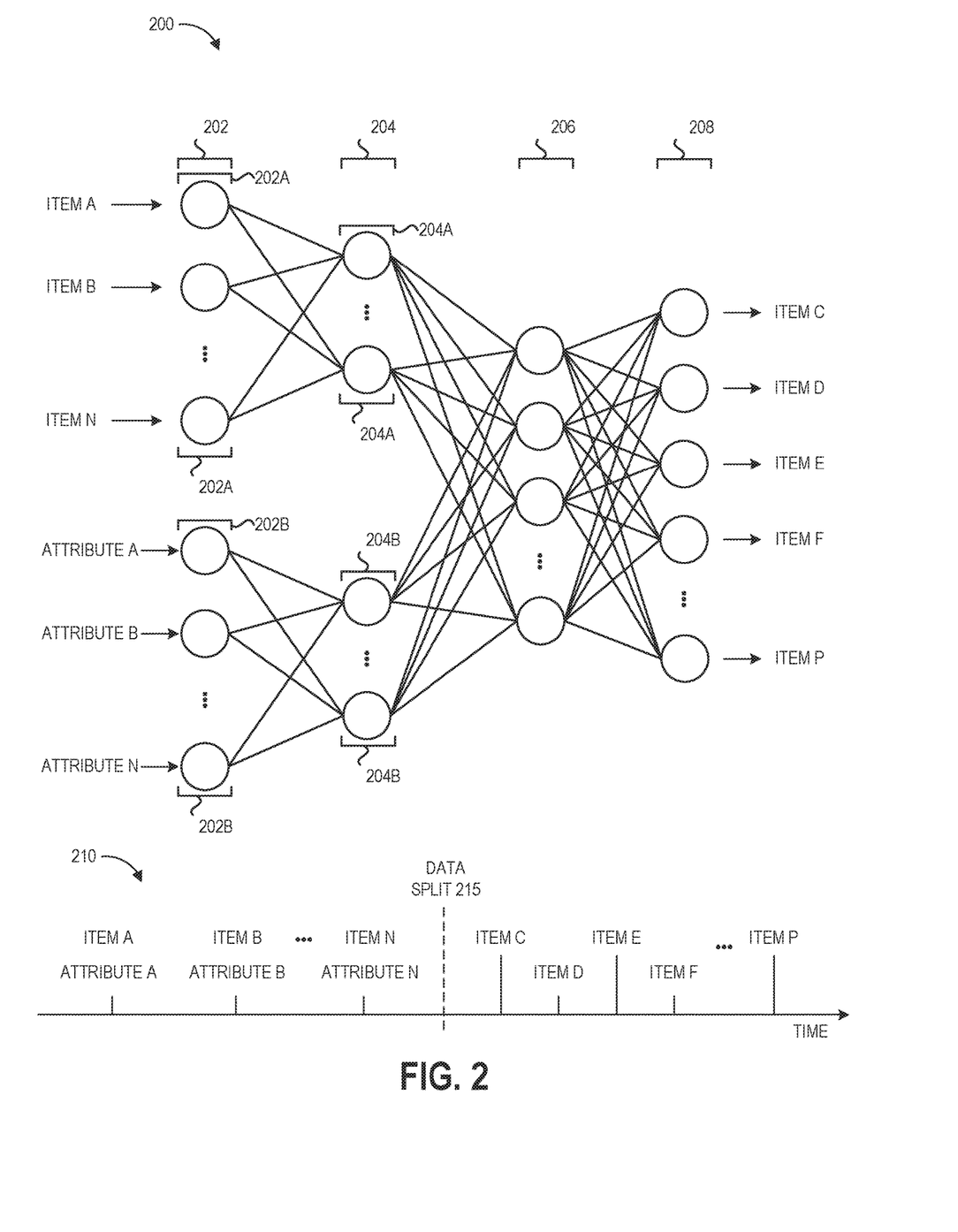
FIG. 2 depicts an example partially-connected topology of a neural network having a timeline and data split for generating a set of inputs and a set of outputs for training the neural network.
Figure 3:
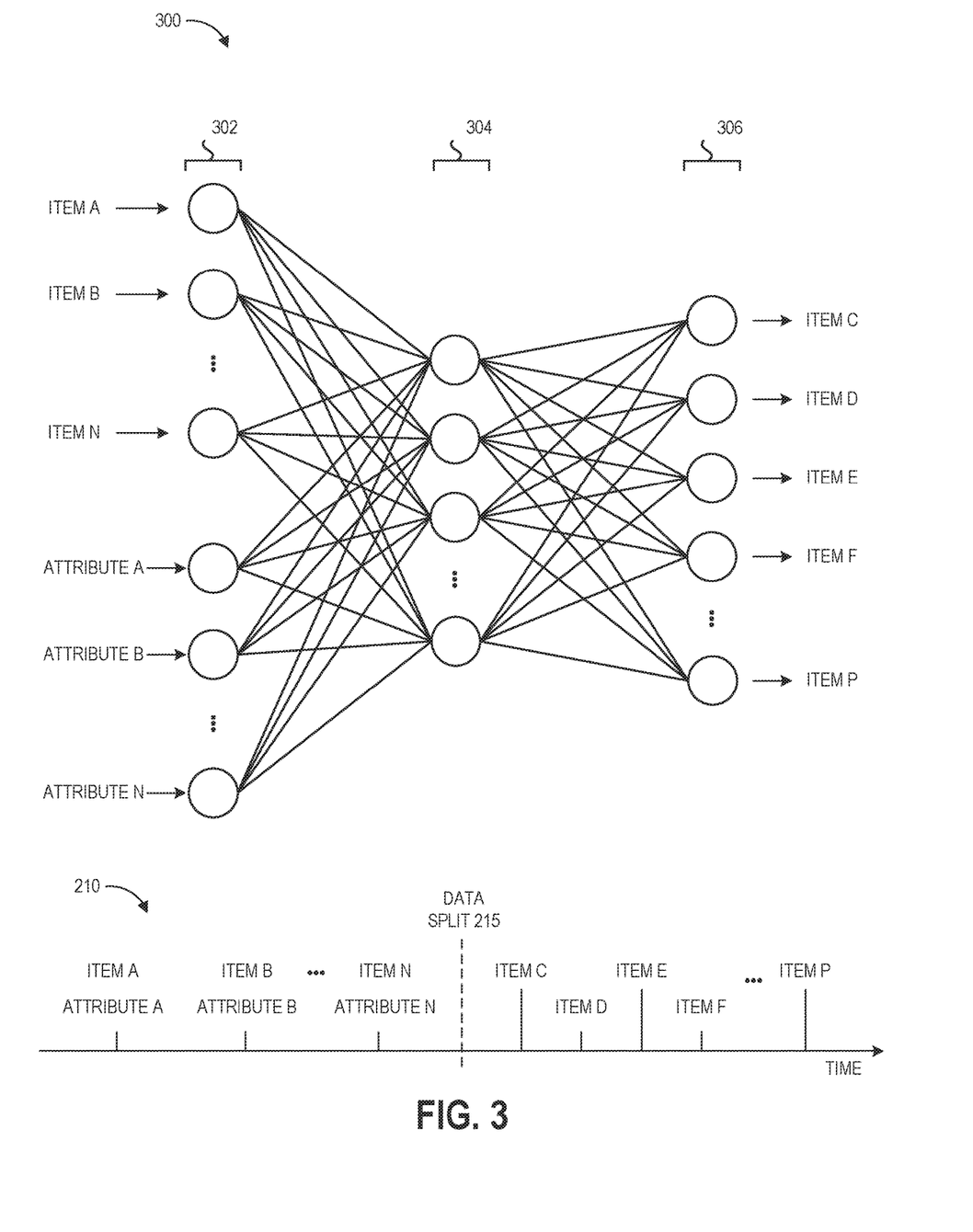
FIG. 3 depicts an example fully connected topology for a neural network that can be trained with the timeline and data split of FIG. 2.

FIG. 2 depicts an example partially-connected topology of a neural network 200 together with a timeline 210 and data split 215 for generating a set of inputs and a set of outputs for training the neural network. FIG. 3 depicts an example fully interlayer connected topology of a neural network 300 that can be trained using the timeline 210 and data split 215. The neural networks 200, 300 can be feed-forward artificial neural networks, for example a multilayer perception, in some implementations.

Generally, an artificial neural network 200, 300 represents a network of interconnected nodes, similar to a biological neural network, where knowledge about the nodes is shared across output nodes and knowledge specific to each output node is retained. Each node represents a piece of information. Knowledge can be exchanged through node-to-node interconnections and node-to-task connections. Input to the artificial neural network 200, 300 activates a set of nodes. In turn, this set of node activates other nodes, thereby propagating knowledge about the input. At each set of nodes, transformative functions may be applied to the data. This activation process is repeated across other nodes until an output node is selected and activated.

Timeline 210 depicts an example training data set and data split 215 that can be used to train neural networks 200, 300. As shown, the example training data set includes items A, B, through N having user-item interaction events before the data split 215 and items C, D, E, F, through P having user-item interaction events after the data split 215. The training data also includes attributes A, B, through N associated with items A, B, through N. Other examples of training data can include one or more attributes for some or all of the items A through N. Based on the data split, the training data of timeline 210 can be separated into an input group including items A through N and attributes A through N and an output group including items C through P.

As shown in FIG. 2, partially connected neural network 200 has an input layer 202 with a number of nodes ("input nodes"), a first hidden layer 204 with a number of nodes ("first layer of hidden nodes"), a second hidden layer 206 with a number of nodes ("second layer of hidden nodes"), and an output layer 208 with a number of nodes ("output nodes"). The input layer 202 is partially connected to the first hidden layer 204. A first subset 202A of the input nodes are fully interconnected to a first subset 204A of the first layer of hidden nodes but are uncoupled from a second subset 204B of the first layer of hidden nodes. Similarly, a second subset 202B of the input nodes are fully interconnected to the second subset 204B of the first layer of hidden nodes but are uncoupled from the first subset 204A of the first layer of hidden nodes. In turn, both the first and second subsets 204A, 204B of the first layer of hidden nodes are fully interconnected to the second layer of hidden nodes, and the second layer of hidden nodes are fully connected to the output nodes. As shown, item identifiers (item A, item B . . . item N) of items on one side of the data split 215 can be fed into the first subset 202A of input nodes and attribute data (attribute A, attribute B . . . attribute N) of the items (and optionally also of users who interacted with the items) on the same side of the data split 215 can be fed into the second subset 202B of input nodes. Item identifiers (item C . . . item P) of items on the other side of the data split 215 can be fed into the output nodes 208.

As shown in FIG. 3, fully connected neural network 300 has an input layer 300 with a number of nodes ("input nodes"), a hidden layer 304 with a number of nodes ("hidden nodes"), and an output layer 306 with a number of nodes ("output nodes"). The input nodes are fully interconnected to the hidden nodes, and the hidden nodes are fully connected to the output nodes. As shown, item identifiers (item A, item B . . . item N) of items on one side of the data split 215 and attribute data (attribute A, attribute B . . . attribute N) of the items (and optionally also of users who interacted with the items) on the same side of the data split 215 can be fed into the input nodes 302. Item identifiers (item C . . . item P) of items on the other side of the data split 215 can be fed into the output nodes 306.

As used herein, an interconnection may represent a piece of information learned about the two interconnected nodes. In comparison a connection between a hidden node and an output node may represent a piece of information learned that is specific to the output node. The interconnection may be assigned a numeric weight that can be tuned (e.g., based on a training dataset), rendering the artificial neural network 200, 300 adaptive to inputs and capable of learning.

The specific number of layers and number of nodes per layer shown in FIGS. 2 and 3 are illustrative only, and are not intended to be limiting. In some neural networks, different numbers of internal layers and/or different numbers of nodes in the input, hidden, and/or output layers may be used. For example, in some neural networks the layers may have hundreds, thousands, or even millions of nodes based on the number of data points in the input and/or output training data. Although FIG. 2 depicts one partially connected hidden layer 204 and one fully connected hidden layer 206, in some neural networks there may be two or more of one or both of the partially connected hidden layer and fully connected hidden layer. Although only one hidden layer 204 is shown in FIG. 3, in some neural networks there may be 2, 4, 5, 10, or more internal layers. In some implementations, each layer may have the same number or different numbers of nodes. For example, the input layer or the output layer can each include more nodes than the hidden layer(s). The input layer and the output layer can include the same number or different number of nodes. The input vectors, or the output vectors, used to train the neural network may each include n separate data elements or "dimensions," corresponding to the it nodes of the neural network input layer (where n is some positive integer).

Generally, the hidden layer 204, 206, 304 allows knowledge about the input nodes of the input layer 202, 302 to be shared amongst the output nodes of the output layer 208, 306. To do so, an activation function $f$ is applied to the input nodes through the hidden layer. In an example, the activation function $f$ may be non-linear. Different non-linear activation functions $f$ are available including, for instance, a rectifier function $f(x)=\max(0, x)$. In an example, a particular non-linear activation function $f$ is selected based on cross-validation. For example, given known example pairs (x, y), where x $\in$ X and y $\in$ Y, a function $f$ X→Y is selected when such a function results in the best matches (e.g., the best representations of actual correlation data).

The artificial neural network 200, 300 may also use a cost function to find an optimal solution (e.g., an optimal activation function). The optimal solution represents the situation where no solution has a cost less than the cost of the optimal solution. In an example, the cost function includes a mean-squared error function that minimizes the average squared error between an output $f(x)$ and a target value y over the example pairs (x, y). In some embodiments, a backpropagation algorithm that uses gradient descent to minimize the cost function may be used to train the artificial neural network 200, 300. In some embodiments, the artificial neural network 200, 300 may be an autoencoder neural network, in which both inputs and outputs are provided to the artificial neural network during training and the autoencoder learns to reconstruct its inputs.

The input layer 202, 302 includes a set of nodes that are referred to herein as input nodes. Each of these input nodes may be mapped to a particular item interaction event in a sliding window of less recent item interaction events. The output layer 208, 306 includes a set of nodes that are referred to herein as output nodes. Each of these output nodes may be mapped to a particular item interaction event in a sliding window of more recent item interaction events. In the depicted examples, a prediction model may be generated such that the hidden layers retain information (e.g., specific variable values and/or transformative functions) for a set of input values and output values used to train the artificial neural networks 200, 300. This retained information may be applied to a set of user-specific input values in order to determine likely output values. As shown, in some embodiments the neural networks 200, 300 may be used to generate a prediction model using inputs that include item interaction events from a plurality of users that occurred before a specified date 215 and outputs that include item interaction events from the plurality of users that occurred after that date 215 (as well as weighted item interaction events occurring before the date). In this example, the resulting prediction model may be applied to a user's past item interaction events to predict the user's likely future item interaction events. For example, the artificial neural network 200, 300 may be used to generate a prediction model using inputs that include item identifiers as well as item attributes of items purchased within a first timeframe. The resulting prediction model can represent not only item to item correlations, but also correlations between item attribute with purchased items.

The outputs of the neural network 200, 300 can be numerical scores representing likelihood of seed-recommended item pair interactions. Some implantations of the disclosed recommendations can be based on output scores from either one of the neural networks 200, 300. Some implantations of the disclosed recommendations can be based on output scores from both of the neural networks 200, 300.

Example Process for Generating a Recommendation Via a Neural Network

Figure 4A:
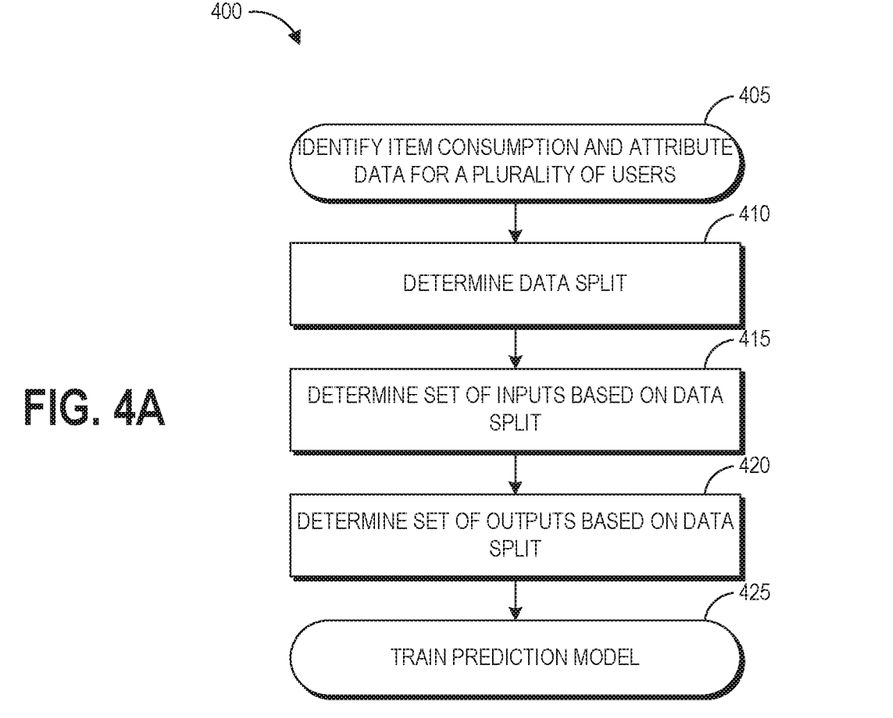
FIG. 4A depicts a flow diagram of an illustrative process for training a prediction model, for example as discussed with respect to FIGS. 2 and 3
Figure 4B:
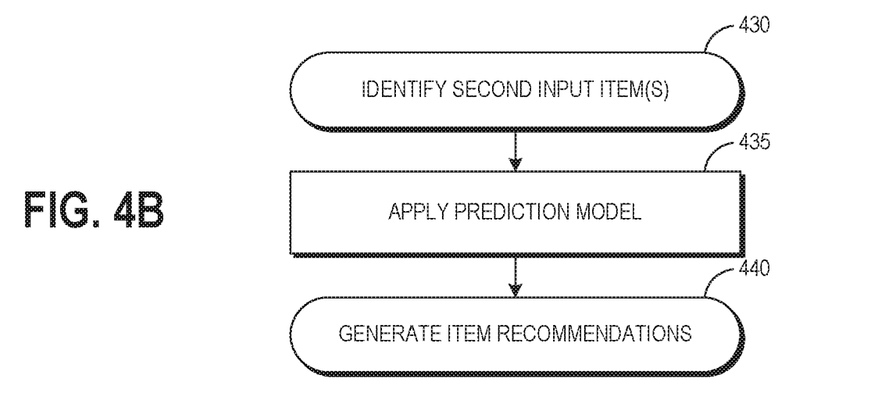
FIG. 4B depicts a flow diagram of an illustrative process for providing user-specific item interaction event predictions in the recommendation engine of FIG. 1 via a neural network trained as described with respect to FIG. 4A.

FIGS. 4A and 4B depict flow diagrams of two portions of an illustrative process 400 for providing user-specific item interaction event predictions. FIG. 4A depicts portion of the process 400 for training a prediction model, for example as discussed with respect to FIGS. 2 and 3, and FIG. 4B depicts a portion of the process 400 for providing user-specific item interaction event predictions in the recommendation engine of FIG. 1 via a neural network trained as described herein, for example with respect to FIGS. 2 and 3 with respect to FIG. 4A. Some or all of the process 400 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. For example, the process 400 may be performed by the interactive computing system 500 of FIG. 5. The code may be stored on a computer-readable storage medium, for example, in the form of a computer program comprising a plurality of instructions executable by one or more processors. The computer-readable storage medium may be non-transitory.

At block 405 the process 400 can identify item interaction data for a plurality of users and attribute data associated with the consumed items. For example, in some embodiments, the plurality of users may be users of an electronic marketplace and item interaction events may comprise purchase transactions for a number of items provided by the electronic marketplace. In this example, historical item purchase data, together with attribute information regarding the purchased items, may be used to periodically train a prediction model using one or more machine learning techniques.

At block 410, the process 400 can determine a data split to be used in identifying a set of input values and a set of output values from the item interaction data. In some embodiments, the data split may be a date threshold. A date threshold may be a set date (for example, Jan. 1, 2016), a floating date (for example, the date exactly one week after the beginning of the data set), or any other suitable type of date threshold. Some embodiments may set a far date threshold and a near date threshold, for example two years prior and two weeks after the two year date, in order to identify a more recent group of the item interaction data as the expected output values and a less recent group of the item interaction data as the input values. In some embodiments, the data split may be a difference in item category or type. For example, item interaction events of a first type may be included in a set of input values and item interaction events of a second type may be included in a set of output values such that a user's interactions with the first type of item may be used to predict the user's preference with respect to the second type of item.

At block 415, the process 400 can determine a set of input values based on the data split. In some embodiments, all item interaction events on one side of the data split (for example, occurring before a date threshold) together with attributes of the events may be included in an input set. As discussed above, attributes can include item attributes and optionally user attributes. In embodiments using just item attributes, the resulting recommendations can be non-personalized, that is, the same recommendation would be presented to each user interacting with the same item. In embodiments that incorporate customer attributes, the recommendations can be include a degree of personalization such that customers having similar attributes to one another would be presented with the same recommendations when interacting with the same item, while customers having different attributes may be presented with different recommendations when interacting with the same item. In some embodiments, a time-decay function may be used to weight item interaction events within the set of inputs. For example, item interaction events (and associated attributes) that have occurred more recently may be given greater weight than item interaction events (and associated attributes) that occurred further in the past. In some embodiments, only item interaction events (and associated attributes) that have occurred within a predetermined period of time may be included in a set of inputs.

At block 420, the process 400 can determine a set of output values based on the data split. In some embodiments, all item interaction events on the opposite side of the data split (for example, occurring after a date threshold) from the input set can be included in an output set. Some embodiments may include attributes of the events in the output data. In some implementations the output data can be weighted according to a time-decay function, for example by weighting events in proportion to an amount of time that has elapsed since the occurrence of that item interaction event or according to a time-decay function.

At block 425, the process 400 can determine a prediction model based on the determined set of input value and the determined set of output values. In some embodiments, the set of inputs and the set of outputs may be used to train a machine learning technique, for example a neural network. For example, the set of inputs and the set of outputs may be input to an autoencoder neural network machine, which will learn patterns and/or correlations between each of the inputs and each of the outputs using one or more cost functions.

At block 430, the process 400 can identify second input item(s). This can include one or more items from a purchase history of a customer, from a recent click history or other interaction history of the customer, and the like. In some embodiments, the number of second input items can be relatively small compared to a number of output recommendation items, for example including just one, two, three, or four items to input into the trained model.

At block 435, the process 400 can apply the generated prediction model to the second input item(s) to generate a number of output recommendation items that a user is likely to consume concurrently with a seed item. As used herein, concurrently can refer to the first and second events occurring (1) during the same purchase order in an electronic marketplace, (2) during the same browsing session in a digital content environment, or (3) as actions performed by the same user within a predefined time interval or predefined set of related behaviors. For example, the second input item(s) may be included in a second set of inputs into a neural network trained as described above to generate a score representing the likelihood of a given user interacting with a number of other items after interacting with the first item.

At block 440, the process 400 can use the output to generate a number of recommended items. For example, the other items can be ranked according to their output scores, and a predetermined number of items and/or a number of items having output scores above a threshold can be stored and/or output as recommended items to the user. In some embodiments, the process 300 can provide these similar item interaction predictions to another module or application. For example, the item interaction predictions may be used by a targeted advertisement provider to provide advertisements to that user that are likely to be effective. In another example, the item interaction predictions may be used within an electronic marketplace to recommend products to the user that he or she is likely to be interested in.

Execution Environment

Figure 5:
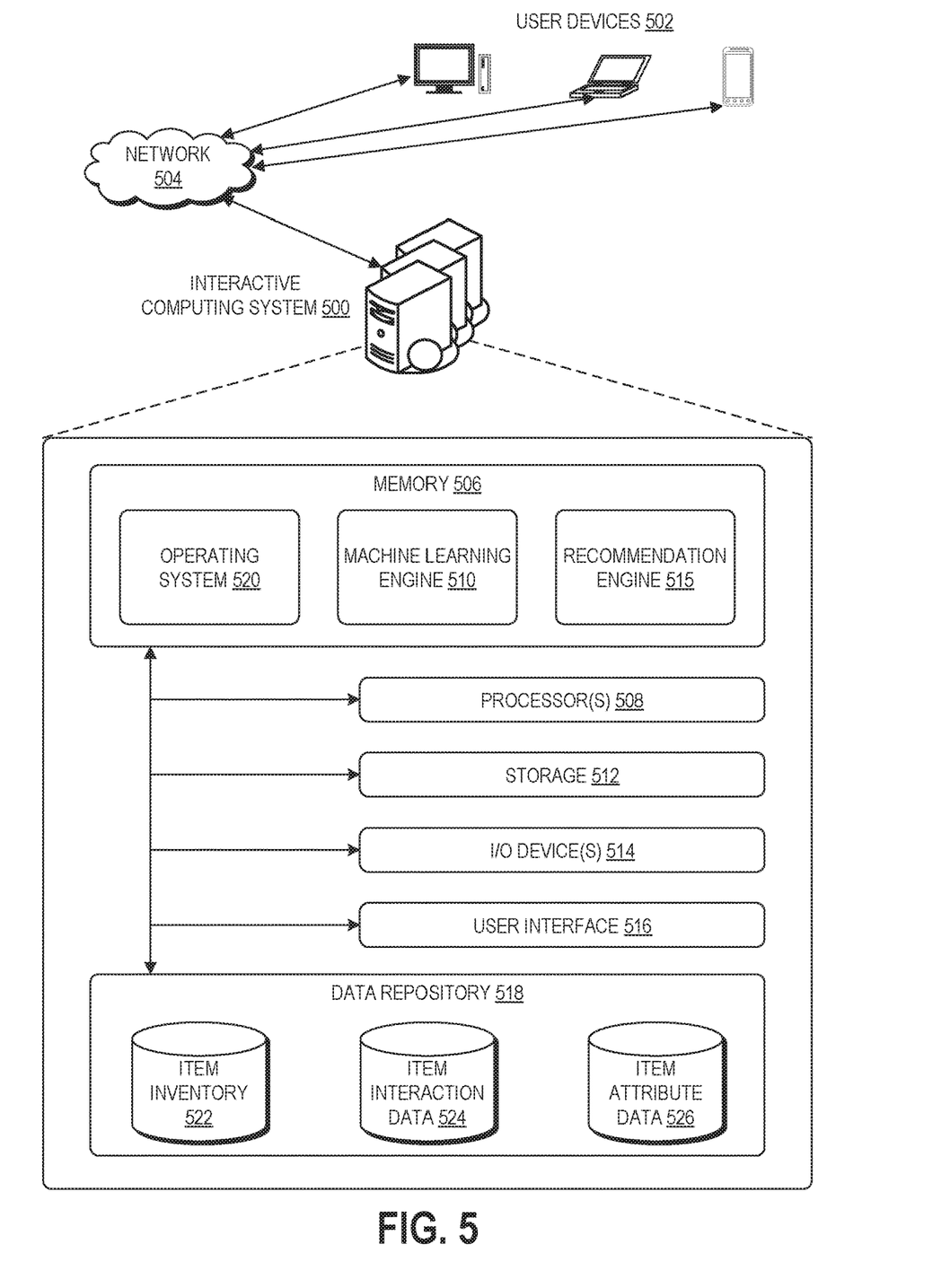
FIG. 5 is a block diagram of an illustrative computing system configured to implement training and processing of artificial neural networks, for example in the recommendation engine of FIG. 1.

FIG. 5 is a block diagram of an illustrative computing system configured to implement training and processing of artificial neural networks as described above. The architecture of the interactive computing system 500 may include a memory 506 storing an operating system 520, machine learning engine 510, and recommendation engine 515, which can be in direct communication with one another or distributed among computing devices within a networked computing system and in communication with each other. Components used for the architecture may depend at least in part upon the type of network and/or environment selected.

The interactive computing system 500 may include one or more computers, perhaps arranged in a cluster of servers or as a server farm. The memory and processors that make up these computers may be located within one computer or distributed throughout many computers as detailed herein. These servers may be configured to train recommendations engines and manage recommendations. For example, the interactive computing system 500 may be configured to manage recommendations offered in connection with an electronic marketplace.

The interactive computing system 500 may include at least one memory 506 and one or more processing units (or processor(s)) 508. The memory 506 may include more than one memory and may be distributed throughout the interactive computing system 500. The memory 506 may store program instructions that are loadable and executable on the processor(s) 508 as well as data generated during the execution of these programs. Depending on the configuration and type of memory, the memory 506 may be volatile (such as random access memory (RAM)) and/or non-volatile (such as read-only memory (ROM), flash memory, or other memory). In some examples, the memory 506 may include multiple different types of memory, such as static random access memory (SRAM), dynamic random access memory (DRAM), or ROM. The memory can store the program instructions as a number of modules that configure processor(s) 508 to perform the various functions described herein, for example operating system 520, machine learning engine 510, and recommendation engine 515.

The memory 506 may include operating system 520 for interacting with the interactive computing system 500. Interactive computing system 500 can host an interactive electronic catalog through which users can view and purchase items.

As discussed above, the machine learning engine 510 may be configured to manage item interaction data splits and train a neural network or other prediction model as described above. The recommendation engine 515 can be configured to implement prediction models generated by the machine learning engine 510 to provide recommendations or predictions, for example to users of an electronic commerce system.

The processor 508 may include one or more general purpose computers, dedicated microprocessors, graphics processors, or other processing devices capable of communicating electronic information and/or training complex machine learning models. Examples of the processor 508 include one or more application-specific integrated circuits (ASICs), field programmable gate arrays (FPGAs), digital signal processors (DSPs) and any other suitable specific or general purpose processors. Computer-executable instruction, software or firmware implementations of the processor may include computer-executable or machine-executable instructions written in any suitable programming language to perform the various functions described. The processor 508 may be implemented as appropriate in hardware, firmware, or combinations thereof with computer-executable instructions and/or software. Computer-executable instructions and software may include computer-executable or machine-executable instructions written in any suitable programming language to perform the various functions described.

In some examples, the interactive computing system 500 may also include additional storage 512, which may include removable storage and/or non-removable storage. The additional storage 512 may include, but is not limited to, magnetic storage, optical disks, and/or tape storage. The disk drives and their associated computer-readable media may provide non-volatile storage of computer-readable instructions, data structures, program modules, and other data for the computing devices. The memory 506 and the additional storage 512, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules, engines, and components, may refer to programming modules executed by computing systems (e.g., processors) that are part of the architecture. The interactive computing system 500 may also include input/output (I/O) device(s) and/or ports 514, such as for enabling connection with a keyboard, a mouse, a pen, a voice input device, a touch input device, a display, speakers, a printer, or other I/O device.

The interactive computing system 500 may also include a user interface 516. The user interface 516 may be utilized by a user to access portions of the interactive computing system 500. In some examples, the user interface 516 may include a graphical user interface, web-based applications, programmatic interfaces such as application programming interfaces (APIs), or other user interface configurations. The user interface 516 can include displays of the recommendations described herein.

The interactive computing system 500 may also include a data store 518. In some examples, the data store 518 may include one or more data stores, databases, data structures, or the like for storing and/or retaining information associated with the interactive computing system 500. Thus, the data store 518 may include data structures, such as an item inventory database 522, item interaction data repository 524, and item attribute data repository 526.

The item inventory database 522 may be used to retain information about items available within the interactive computing system 500. As described above, items can include physical and/or digital products available for purchase in an electronic marketplace. In other embodiments items can include advertisements, web pages, and other digital content. The item inventory database 522 may be updated as the selection of available items changes over time. The item interaction data repository 524 can store logged user behaviors with respect to the items currently and/or previously in the item inventory database. The item attribute data repository 526 can include a number of attributes associated with items or events in the item interaction data repository 524 as described herein.

The interactive computing system 500 can communicate over network 504 with user devices 502. The network 504 can include any appropriate network, including an intranet, the Internet, a cellular network, a local area network or any other such network or combination thereof. User devices 502 can include any network-equipped computing device, for example desktop computers, laptops, smartphones, tablets, e-readers, gaming consoles, and the like. Users can access the interactive computing system 500 and interact with items therein via the network 504 and can be provided with recommendations via the network 504.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A non-transitory computer readable medium storing a computer-executable module that, when executed by a computing system comprising one or more processors, causes the computing system to perform a process comprising:
    obtaining first training data representing a plurality of user-item interaction events during a predetermined timeframe, each user-item interaction event comprising an interaction between a human user of an electronic catalog and a representation of one of a plurality of items in the electronic catalog;
    obtaining second training data representing a plurality of attributes associated with each of the plurality of user-item interaction events;
    assigning, to an input group:
        a first subset of the plurality of items associated with a less recent subset of the plurality of user-item interaction events occurring within a first window between a beginning of the predetermined timeframe and a data split time, and
        a subset of the plurality of attributes associated with the less recent subset of the plurality of user-item interaction events, and
    assigning, to an expected output group, a second subset of the plurality of items associated with user-item interaction events occurring within a second window between the data split time and an end of the predetermined timeframe;
    training a machine learning model to predict the expected output group based on the input group, wherein training the machine learning model comprises (1) providing the input group to input layer nodes of a neural network, and (2) providing the expected output group to output layer nodes of the neural network;
    obtaining data representing at least a first item and a second item available in the electronic catalog; and
    generating, using the machine learning model and the data representing the first item and the plurality of other items available in the electronic catalog, a score reflecting a likelihood that a user interacting with the first item will also interact with the second item.

2. The non-transitory computer readable medium of claim 1, wherein the user-item interaction events comprise one or more of an item purchase, item view, and item share event.

3. The non-transitory computer readable medium of claim 1, wherein the first training data includes sets of histories of a plurality of different users of the electronic catalog, and wherein the input group and output group are populated with items and associated attributes only from sets of histories including data in both the first and second windows.

4. The non-transitory computer readable medium of claim 1, wherein the process performed by the computer-executable module, when executed by the computing system, further comprises:
    receiving an indication of user interaction with a representation of the first item in the electronic catalog; and
    causing display of a recommendation for the second item.

5. The non-transitory computer readable medium of claim 4, wherein the indication comprises a user viewing a network page including information representing the first item or queuing the first item for purchase.

6. The non-transitory computer readable medium of claim 1, wherein the first window is substantially shorter in time than the second window.

7. The non-transitory computer readable medium of claim 1, wherein the computer-executable module, when executed, causes some user-item interaction events in a user's event history to be allocated solely to the input group and causes other user-item interaction events in the user's event history to be allocated solely to the expected output group.

8. A computer-implemented method, comprising:
    maintaining user-specific event histories for each of a plurality of users of an electronic catalog, each event history corresponding to a respective user and comprising event data representing user-item interaction events performed by the user, wherein the event data for each user-item interaction event includes an identifier of a catalog item corresponding to the event and a time of the user-item interaction;
    dividing each user-specific event history such that user-item interaction events that occurred before a split time are allocated exclusively to an input group and user-item interaction events that occurred after the split time are allocated exclusively to an expected output group;
    training a neural network to predict user-item interaction events falling in the expected output group, wherein training the neural network comprises (1) providing, to input layer nodes of the neural network, identifiers and attributes of catalog items represented in the input group, and (2) providing, to output layer nodes of the neural network, identifiers of catalog items represented in the expected output group; and generating, with the trained neural network, a score representing a likelihood that a user that interacts with a particular first catalog item will also interact with a particular second catalog item;

said method performed by execution of program instructions by a computing system.

9. The method of claim 8, wherein the input group corresponds to a time window that is substantially shorter in duration than a time window corresponding to the expected output group.

10. The method of claim 8, wherein training the neural network further comprises providing, to the input layer nodes, user attributes of users corresponding to the user-specific event histories.

\* \* \* \* \*

UNITED STATES PATENT AND TRADEMARK OFFICE
CERTIFICATE OF CORRECTION

PATENT NO. : 10,650,432 B1
APPLICATION NO. : 15/362585
DATED : May 12, 2020
INVENTOR(S) : Rejith George Joseph Page 1 of 1

It is certified that error appears in the above-identified patent and that said Letters Patent is hereby corrected as shown below:

In the Specification

At Column 10, Line 38, delete "it" and insert --n--.

Signed and Sealed this
Fourth Day of August, 2020

Andrei Iancu
*Director of the United States Patent and Trademark Office*